United States Patent
Wong et al.

(10) Patent No.: US 11,726,269 B2
(45) Date of Patent: Aug. 15, 2023

(54) LOCKABLE MPO CONNECTOR FOR SECURING WITHIN A PORT OF AN ADAPTER HAVING A UNIQUE REMOVAL KEY

(71) Applicant: Senko Advanced Components, Inc., Marlborough, MA (US)

(72) Inventors: Yim Wong, Kowloon (HK); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 232 days.

(21) Appl. No.: 17/028,962

(22) Filed: Sep. 22, 2020

(65) Prior Publication Data

US 2021/0088733 A1 Mar. 25, 2021

Related U.S. Application Data

(60) Provisional application No. 62/904,751, filed on Sep. 24, 2019.

(51) Int. Cl.
*G02B 6/38* (2006.01)
(52) U.S. Cl.
CPC ......... *G02B 6/3885* (2013.01); *G02B 6/3825* (2013.01); *G02B 6/3894* (2013.01)
(58) Field of Classification Search
CPC ..................................................... G02B 6/38
USPC ........................................................... 385/78
See application file for complete search history.

(56) References Cited

U.S. PATENT DOCUMENTS

| | | | | |
|---|---|---|---|---|
| 6,130,983 A * | 10/2000 | Cheng | .................. | G02B 6/3829 |
| | | | | 385/139 |
| 6,464,403 B1 * | 10/2002 | Koch | .................. | G02B 6/3897 |
| | | | | 385/139 |
| 9,684,139 B2 * | 6/2017 | Chang | .................. | G02B 6/3825 |
| 9,798,090 B2 * | 10/2017 | Takano | .................. | G02B 6/3897 |
| 9,907,616 B1 * | 3/2018 | Fried | .................... | A61B 18/26 |
| 10,295,759 B2 | 5/2019 | Wong et al. | | |
| 10,520,685 B2 * | 12/2019 | Watanabe | ............. | G02B 6/3885 |
| 11,175,466 B2 * | 11/2021 | Gniadek | ............... | G02B 6/3821 |
| 11,215,769 B2 * | 1/2022 | Seri | ....................... | G02B 6/3893 |
| 2007/0160327 A1 * | 7/2007 | Lewallen | ............. | G02B 6/3885 |
| | | | | 385/53 |
| 2010/0027955 A1 * | 2/2010 | Parikh | .................. | G02B 6/4477 |
| | | | | 385/135 |
| 2012/0177335 A1 * | 7/2012 | Lee | ......................... | G02B 6/389 |
| | | | | 385/136 |
| 2012/0213478 A1 * | 8/2012 | Chen | .................... | G02B 6/3616 |
| | | | | 385/60 |
| 2015/0177467 A1 * | 6/2015 | Gniadek | ............. | H01R 13/625 |
| | | | | 439/365 |

(Continued)

FOREIGN PATENT DOCUMENTS

JP 2006337637 A * 12/2006
WO WO-2018140873 A1 * 8/2018 ........... G02B 6/3821

*Primary Examiner* — Kaveh C Kianni

(57) ABSTRACT

Lockable connector and adapter assembly with a rear body having a shield to prevent unlocking of the connector from the adapter port unless the connector is unlocked with a key configured for the connector. The lockable connector is a MPO connector with a slidable outer housing configured to receive a key latch arm of specific configuration to unlock the MO connector from the adapter port. The key latch arms or separate keys form the combination unlocking the MPO connector from the adapter port.

10 Claims, 22 Drawing Sheets

(56) References Cited

U.S. PATENT DOCUMENTS

| | | | |
|---|---|---|---|
| 2016/0177677 A1* | 6/2016 | Gonzalez | G02B 6/4416 |
| | | | 166/351 |
| 2016/0259135 A1* | 9/2016 | Gniadek | G02B 6/3895 |
| 2017/0139158 A1* | 5/2017 | Coenegracht | G02B 6/3891 |
| 2017/0184798 A1* | 6/2017 | Coenegracht | G02B 6/3885 |
| 2017/0192182 A1* | 7/2017 | Peterson | G02B 6/3885 |
| 2018/0217338 A1* | 8/2018 | Takano | G02B 6/3879 |
| 2018/0026725 A1 | 9/2018 | Takano et al. | |
| 2018/0329152 A1* | 11/2018 | Verheyden | G02B 6/3897 |
| 2019/0170961 A1* | 6/2019 | Coenegracht | G02B 6/4444 |
| 2019/0227244 A1* | 7/2019 | Huang | G02B 6/3891 |
| 2020/0183093 A1* | 6/2020 | Chang | G02B 6/3825 |
| 2020/0228166 A1* | 7/2020 | Scherer | H02J 50/80 |
| 2021/0325614 A1* | 10/2021 | Childers | G02B 6/3885 |

\* cited by examiner

LOCKABLE MPO CONNECTOR FOR SECURING WITHIN A PORT OF AN ADAPTER HAVING A UNIQUE REMOVAL KEY

RELATED APPLICATIONS

The present application claims priority to provisional application 62/904,751, filed Sep. 24, 2019 titled "Lockable MPO Connector With A Combination For Securing The Connector", under 35 U.S.C. 111(a), the provisional is incorporated by reference in its entirety within the present application.

FIELD OF THE INVENTION

The described technology generally relates to lockable connection assemblies configured to provide a secure connection between cable segments, equipment, and/or devices, and, more specifically, to complementary connectors and adapters configured to engage in a locking arrangement that prevents the unintended removal of a connector from an adapter.

BACKGROUND

The efficiency and reliability of telecommunication networks is dependent on various factors, such as the quality of connections between cable segments, network equipment, devices, and other cable segments. Telecommunication equipment is increasingly being used in harsh environments, including factories, motor vehicles, industrial equipment, military equipment, and on cellular antennae towers. In such environments, conventional connection assemblies often become unintentionally disconnected due to vibration, impact, temperature changes, and exposure to other harsh conditions. In addition, the connection between components may be negatively affected by the ingress of dust, dirt, moisture, and/or other contaminants. Fiber optic network segments are particularly vulnerable because fiber optic connections require extremely precise termination and alignment between connected components and cable segments. Accordingly, telecommunication network providers would benefit from a connection assembly capable of maintaining a secure connection and preventing the ingress of unwanted contaminants in harsh environments.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In first embodiment, a lockable MPO connector or a multi-fiber push-on fiber optic connector is locked and unlocked from an adapter using a tool configured to provide one or more locking configurations. The lockable MPO connector comprises an inner housing with an inner cavity securing a mechanical transfer ferrule. The inner housing is surrounded by an outer housing, where the outer housing is slidable with opposing side slots or openings. A rear housing or rear body comprises a shroud or shield that covers the slidable outer housing beyond the side slots, and further read body defines a key passage, where the key passage accepts the tool to unlock an MPO connector from a standard adapter configured to accept the MPO connector inner and outer housing with the mechanical transfer ferrule. The rear body shield prevents access to unlock a conventional or prior art MPO connector, as depicted in FIG. 2 from a prior MPO adapter depicted in FIG. 1. A prior art MPO connector is disclosed in U.S. Pat. No. 9,684,139B2, titled "Optical Fiber Connector with Changeable Gender", to Chang et al., granted Jun. 20, 2017, and owned by the assignee of this application. A prior art MPO adapter is disclosed in U.S. Pat. No. 9,798,090B2, title "Reduced-Profile Data Transmission Element Connectors, Adapters, And Connection Assemblies Thereof", to Takano et al., granted Oct. 24, 2017, and owned by the assignee of this application. U.S. Pat. Nos. 9,684,139B2 and 9,798,090B2 are incorporated by reference into the present application.

The lockable MPO connector key passage extends through the rear body allowing the unlocking tool to access the slidable outer housing and MPO adapter latches to unlock the MPO connector from the adapter, thereby allowing the MPO connector with rear body to separate from the MPO adapter. Each rear body is configured to receive a unique or different key or tool of a particular shape. The inner shape of the key passage matches the outer configuration of the tool or key. An indicator is marked on the tool so a user can match the unlocking tool with a MPO connector configured to be unlocked with the tool. In some embodiments, two or more key passages may be deployed as part of the rear body, and the rear body maybe configured to accept structure, such as an external post or protrusion to align the tool or key before inserting the key via the rear body to unlock the MPO connector from the MPO adapter. The protrusions may be of different lengths or thickness and even a combination of round and square to ensure the key is properly oriented and aligned before fully inserted the tool or key to perform the unlocking step.

In another embodiment, a key arm extending from a proximal end of the key maybe configured in differing shapes such as round or square, and with cut-outs along the key arm. The number of key arms and the orientation, up or down of the cut-out, dictates the number key combinations available on the key. Each key releases a corresponding configured MPO connector from a standard MPO adapter providing lock-out and tag-out security feature for a bank or collection of MPO connectors.

In another embodiment, a tool is used to remove the MPO connector from a standard MPO adapter. The disclosed MPO connector in the present invention, uses a standard or prior art MPO connector with a rear body that shields the MPO adapter latch arms. In the field, MPO connectors can be removed from an adapter unintentionally, or become lose during standard use due to the compact arrangement of connector, such as servicing a first connector and the adjacent connector is partially dislodged without the user knowing. The lockable MPO connector prevents the MPO connector from being dislodged from its corresponding adapter. To remove the MPO connector for routine maintenance such as cleaning, a tool or key is sized and shaped so a user can grasp the tool, insert properly at a distal end of the rear body, and displace the adapter latch arms from a recess within the inner housing of the MPO connector, so the MPO connector can be removed from the MPO adapter. To clean the ferrule endface of the MPO connector, a cleaning tool ss disclosed in U.S. Pub. No. 2018/0267252A1, titled "Gel Stick Cleaner With Reusable Handle And Disposable Cartridge", published Sep. 20, 2018, assigned to the owner of the present application is fully incorporated by reference into the present application.

A pair of opposing latch arms are formed on at the proximal end of the key body, the latch arms are inserted through openings within the rear body provided the correct key arm or key arms are oriented and inserted into the key passage(s) of the rear body. The ley latch arms are is the key arm, instead of a separate set of latch arms and a key arm. The opposing key latch arms have hooks facing outward with corresponding chamfers on each side of the hook. The key latch arm is called an actuator arm. The chamfers prevent the key latch arms jamming or sticking during key insertion into the rear body, and help guide the opposing hooks into the side slots of the slidable outer housing. The key latch arms project from the key body and are configured for releasing adapter latches from the MPO connector, and the key latch arms attach to slots form as part of the MPO outer housing to withdraw the MPO connector assembly (100)(refer to FIG. 9) from the MPO adapter. fOnce the opposing hooks are secure within the side slots, the key is pulled rearward. The key pulling the slidable outer housing rearward results in adapter opposing latches to move out from their corresponding recessed locked positon with the adapter latch arms, thereby, separating or removing the MPO connector from the MPO adapter port. A bias member located on an outer surface of slidable outer housing is compressed, as shown in FIG. 10B, when the adapter latches are displaced from the opposing inner housing recesses. Alternatively, a pair of opposing bias springs may be used as shown in FIG. 4, but without the benefits of the bias member as disclosed in U.S. Pat. No. 10,295,759B2, titled "Optical Connector With Forward-Biasing Projections", Wong et al., granted on May 21, 2019, assigned to the owner of this application and fully incorporated by reference in the present application.

BRIEF DESCRIPTION OF THE DRAWINGS

The above and other objects of the present invention will become more readily apparent from the following detailed description taken in connection with the accompanying drawings.

Corresponding reference characters indicate corresponding parts throughout the drawings.

DETAILED DESCRIPTION

Figure 1:
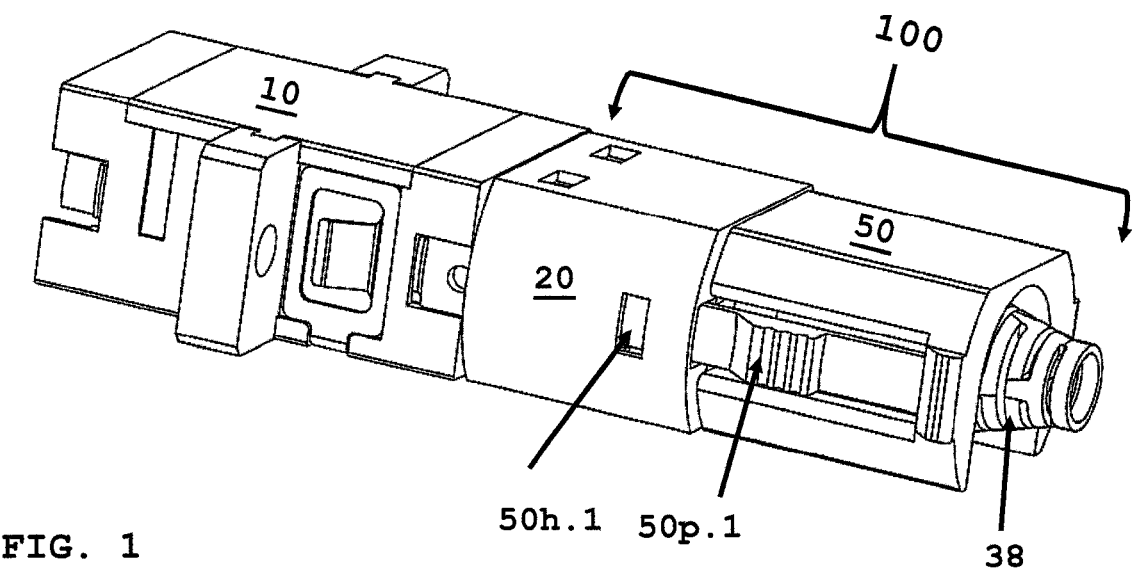
FIG. 1 depicts the assembled invention secured within a standard MPO adapter.

The described technology generally relates to lockable connection assemblies for providing secure connections between cable segments and/or devices within a network. The network may include any type of network capable of transmitting signals, electricity, or any other type of transmission medium. For example, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the lockable connection assemblies may be configured to connect cable segments and/or devices within a fiber optic network using various standard connector types, including, but not limited to LC, ST, SC, FC, DIN, D4, SMA, E2000, Biconic, FullAXS, OCD, and/or MPO. In some embodiments, the lockable connection assemblies may be configured to meet various standards, such as the British Standards Institution (BSI), the Open DeviceNet Vendors Association (ODVA), and/or the like. In some embodiments, the lockable connection assemblies may be used with copper-type network connections, such as RJ-45 type connectors.

According to some embodiments, the lockable MPO connector maybe deployed in an array of MPO connectors with the same key lock. Each MPO connector rear body has an indicator or letter to the user to identify the corresponding key or removal tool to unlock the MPO connector from a standard MPO adapter. The lockable elements help prevent motion of the MPO connector while installed with the MPO adapter, and further helps prevent an unintended removal of the MPO connector from the MPO adapter. The arrays of MPO connectors have a cable assembly of the same color. So, as the user works fingers through the group of fibers, moving the fibers can disturb the MPO ferrule endface of the connector increasing insertion losses due to misalignment. A more damaging situation can occur when the user pulls on a first MPO connector that has its cable assembly tangled with an adjacent MPO connector that results in the second MPO connector becoming dislodged from the MPO adapter port. Here the lockable MPO connector and its key helps prevent a MPO connector from being dislodged, and further provides some organization within the array by key type to guide the user to unlock the correct MPO connector by key indicator on the rear body. During maintenance the communications network is not disabled which means other MPO connectors are transmitting data. The above problems are solved with lockable connectors.

The described technology provides multiple technological advantages. A non-limiting example of an advantage is that the connection between connection components may be maintained in harsh environments in which the lockable connection assembly may be subjected to forces due to such as vibrations, impact, temperature change, moisture, wind, or the like. Another non-limiting example of an advantage is that the lockable connection assembly may be configured to prevent the ingress of unwanted contaminants into the interior of the lockable connection assembly that may interfere with the connection between the connector and the adaptor. A further non-limiting example of an advantage is that the lockable connection assembly may be assembled using relatively low-cost components and locked with minimal labor, thereby providing a cost- and resource-efficient method of providing highly secure connections within a network. The above additional problems are solved with lockable MPO connectors.

FIG. 1 depicts a lockable MPO connector assembly (100) secured with a prior art MPO adapter (10). Lockable MPO connector assembly comprises a rear body (20) or housing (20) (refer to FIG. 7 and FIG. 15) and removal tool (50) or key (refer to FIG. 12, FIGS. 16-19). Key (50) includes key release (50p.1, 50p.2 (not shown)) when pressed inward or toward the optical axis of the assembly (100), the key releases from rear body (20) when proximal hook (50h.1) is displaced from an opening in the rear body.

Figure 2:
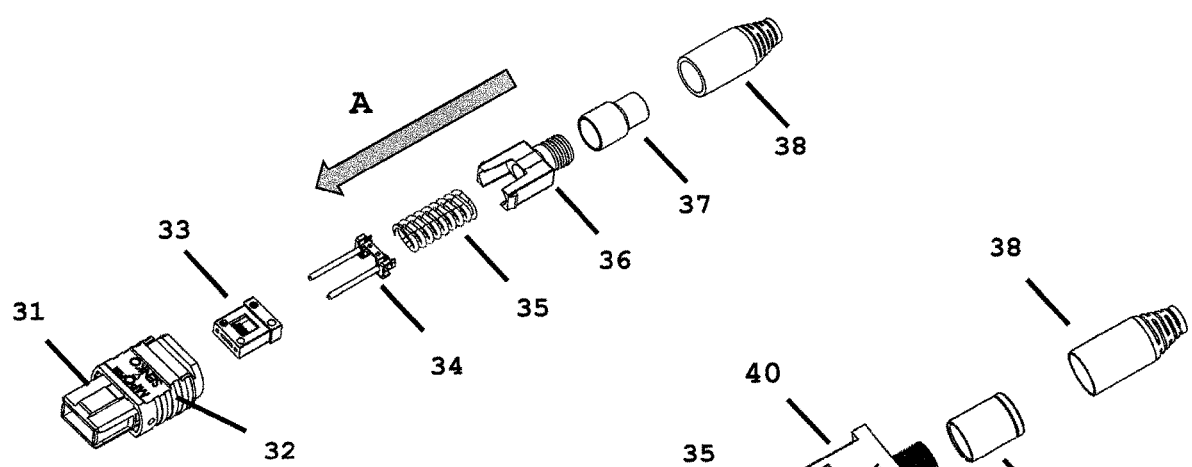
FIG. 2 depicts an exploded view of a prior art MPO connector.
Figure 3:
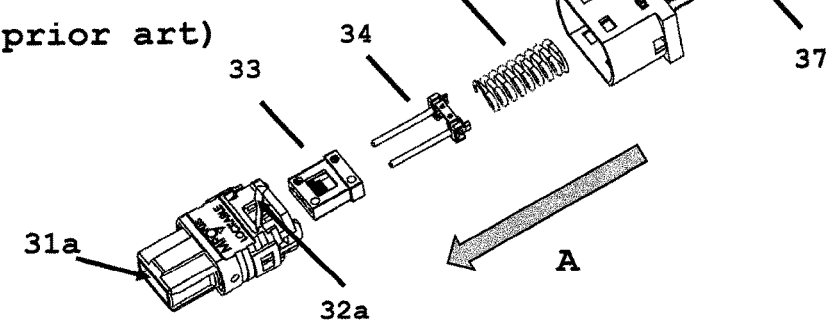
FIG. 3 depicts an exploded view of the MPO connector disclosed in an embodiment of the present invention.

FIG. 2 depicts an exploded view of prior art MPO connector (70) (refer to FIG. 4) assembled in the direction of arrow (A). MPO connector comprises inner housing (31) with slidable outer housing (32) about the inner housing. Mechanical transfer ferrule (33) is secured within a cavity (31a) formed within the inner housing and pin keep (34) is biased by spring (35) to ensure pins (34p.1, 34p.2) (refer to FIG. 9) protrude from a proximal end of the inner housing. Rear body (36) is secured within inner housing and holds the ferrule, pin keep and spring assembly together. A crimp post (36c) (refer to FIG. 6) extends from a distal end of the rear body to receive crimp ring (37) that secures cable boot (38). An optical cable with incoming optical ribbon cable is spliced to the pigtail assembly of the mechanical ferrule. The optical cable is not shown. The optical axis of the MPO connector is in the direction of the assembly indicated by arrow (A). FIG. 3 depicts an embodiment of MPO connector (80) of the present invention deploying rear body (40) (refer to FIG. 7), and further comprises slidable outer housing (32) with side slots (40s.1, 40s.2) (refer to FIG. 5).

Figure 4:
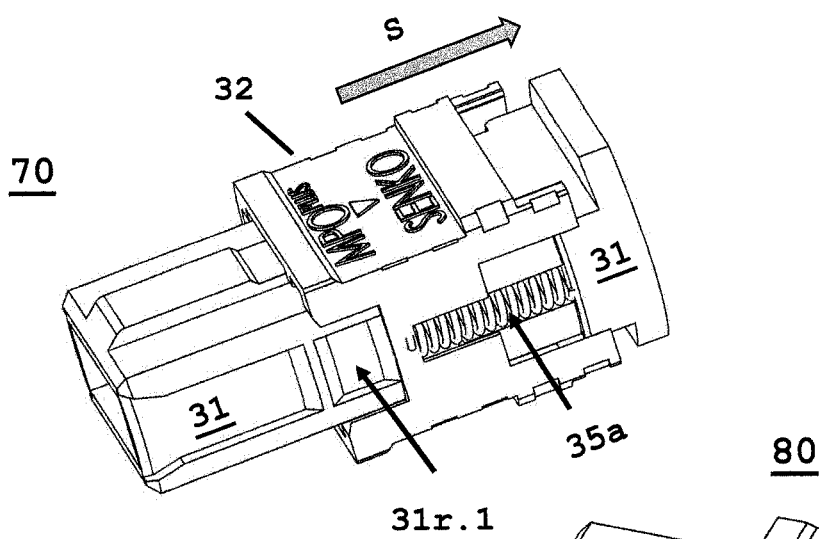
FIG. 4 depicts a perspective view of a MPO connector with a slidable outer housing.
Figure 5:
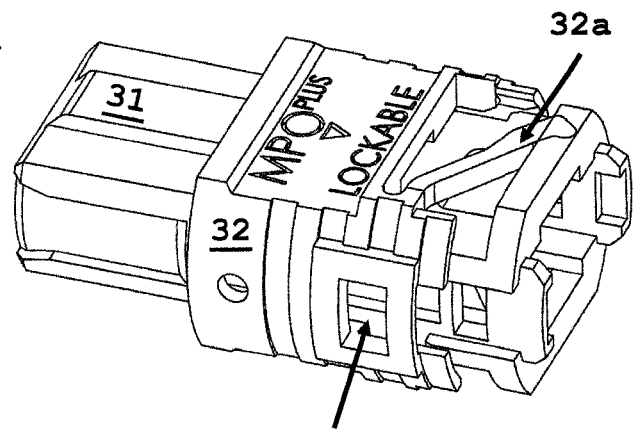
FIG. 5 depicts a perspective view the MPO connector disclosed in an embodiment of the present invention.
Figure 10A:
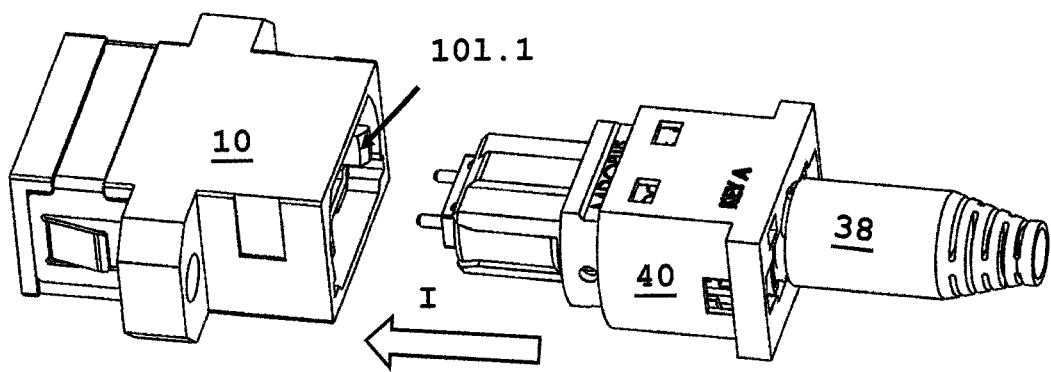
FIG. 10A depicts the assembly MPO connector of FIG. 9 prior to insertion into a prior art MPO adapter.

FIG. 4 depicts prior art MPO connector (70) without side slots or bias member (32a). The bias member (32a) is formed as a leaf spring. Connector (70) using opposing bias springs (35a, 35b (not shown)) to return slidable outer housing (32) nearer the inner housing (31) proximal end. Outer housing (32) covers adapter latch arms (10l.1. 10l.2) (refer to FIG. 10A) when MPO connector (80) is fully inserted into a port of the MPO adapter. The adapter latch arms are received in opposing recesses (31r.1, 31r.2) (not shown in FIG. 5). FIG. 5 depicts MPO connector (80) according to the present invention with opposing side slots (40s.1, 40s.2 (not shown) formed as part of slidable outer housing (32). MPO connector (80) deploys bias member (32a), as disclosed in Wong. As described below, side slots allow of removal tool or key tool access to lock with the slidable outer housing to remove connector (80) from the MPO adapter port (refer to FIG. 13).

Figures 6, 7A:
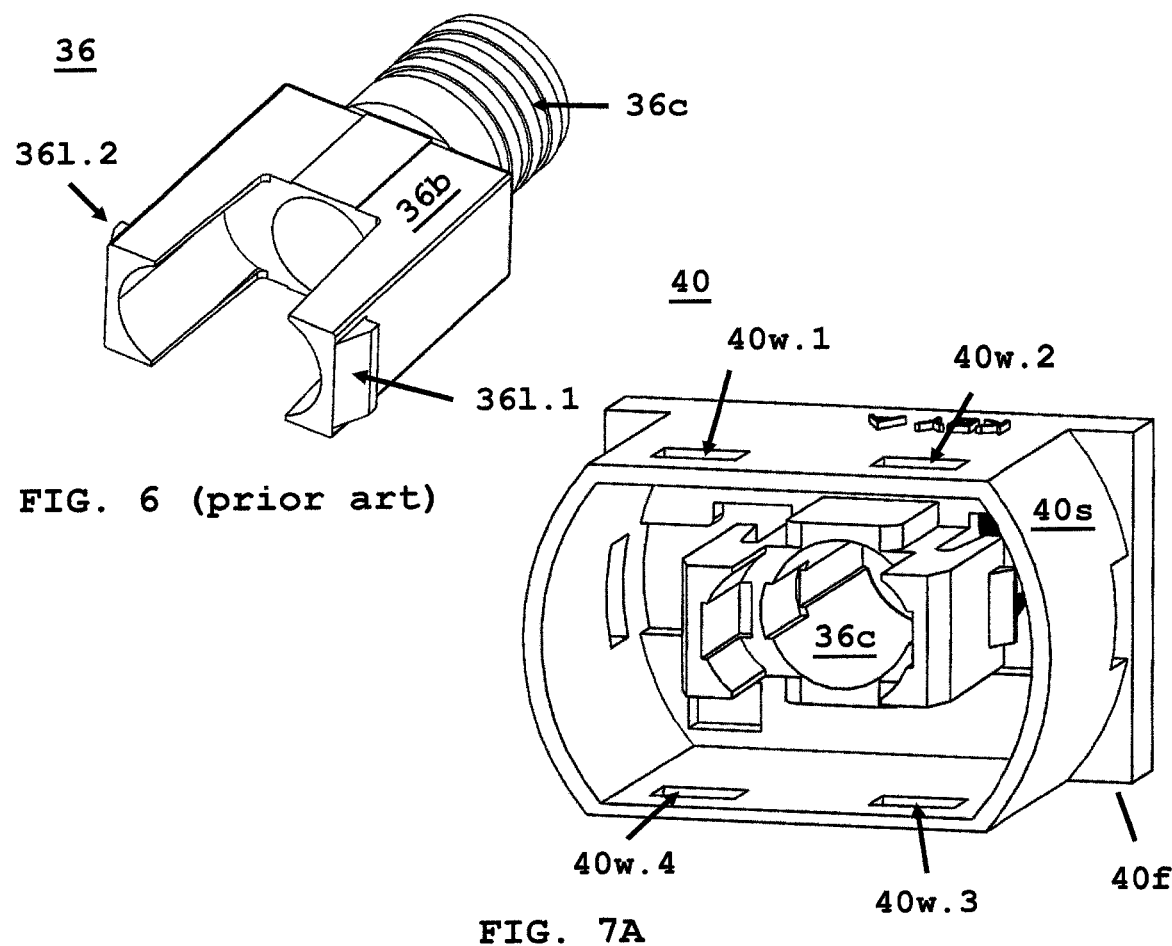
FIG. 6 depicts a perspective view of a prior art rear body deployed in a prior art MPO connector.
FIG. 7A depicts a perspective front or proximal view of a rear body disclosed in an embodiment of the present invention.

FIG. 6 depicts prior art rear body (36) comprising body (36b) with a longitudinal bore along the optical axis to receive the optical ribbon cable, and pair opposing latches (361.1, 361.2) that secure rear body (36) to a distal end of inner housing (31) of MPO connector (70). Crimp post (36c) secures cable boot (38) by crimp ring (37) or threaded cable boot (not shown). Crimp post (36c) may secure the cable jacket or strength members between the crimp ring and the crimp post, as known in the art, to improve pull strength of the cable assembly.

Figure 7B:
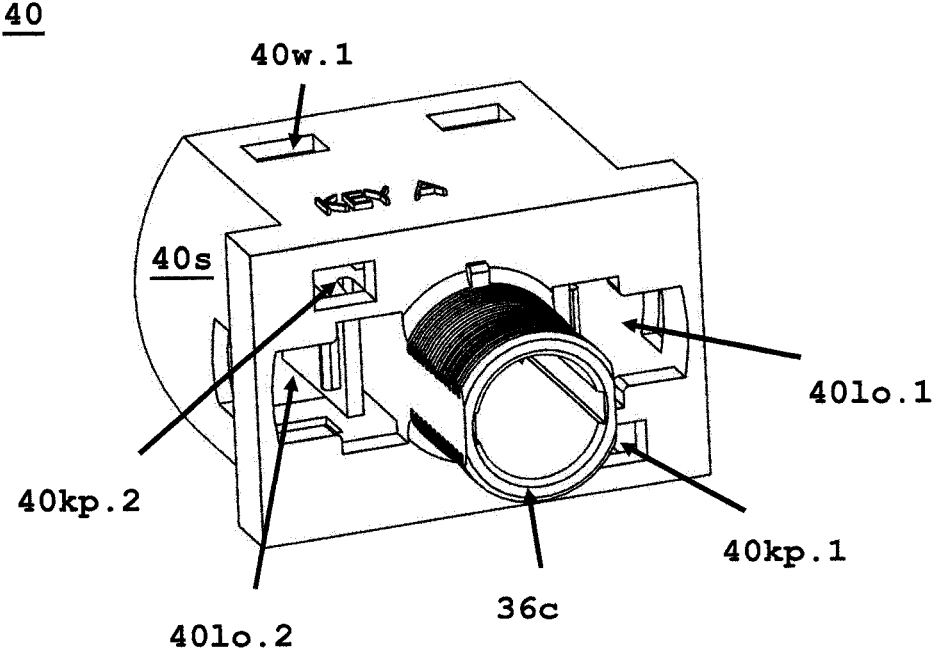
FIG. 7B depicts a perspective rear or distal view of the rear body disclosed in an embodiment of the present invention.

FIG. 7A depicts a proximal view or front view of rear body (40). Rear body (40) comprises flange (40f) and extending away from the flange is shield (40s) formed as a cup. Other shield shapes maybe two wings without departing from the scope of the invention. Windows (40w.1-40w.4) are positioned about the rear body outer housing to provide the user with a visual on far the slidable housing has been moved distally with the key or removal tool and indirectly how much bias member (32a) is compressed. Once fully compressed (refer to FIG. 10B), the MPO connector (80) is released from the port of the MPO adapter. This allows the user to gauge remaining pull strength without over pulling on the key or removal tool. These connectors are small and made of plastic parts to pull forces are set to 10 N or less. FIG. 7B depicts a distal view of rear body (40) comprising crimp pot (36c) bounded by opposing ley latch arm openings (401o.1, 401.2) and further bounded by keep passage (40kp.1, 40kp.2). The number of key passage depends on the key to unlock MPO connector (80) from MPO adapter port. The rear body can have two key passages (40*kp*.1, 40*kp*.2) and key (50) comprises a first key arm (50*k*.1) that differs form a second key arm (50*k*.2) (refer to FIG. 12), to unlock MPO connector (80) from a port of the MPO adapter. The first key arm maybe the same as the second key arm without departing from the scope of the invention.

Figure 8:
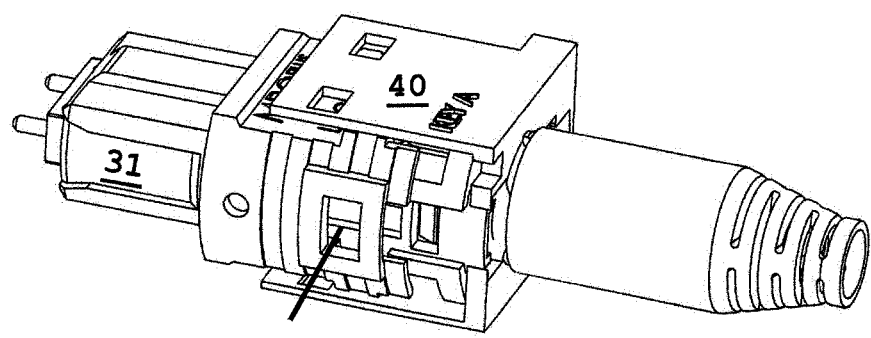
FIG. 8 depicts a partial cut-away view of the MPO connector of FIG. 5 assembled with the rear body of FIG. 7.
Figure 9:
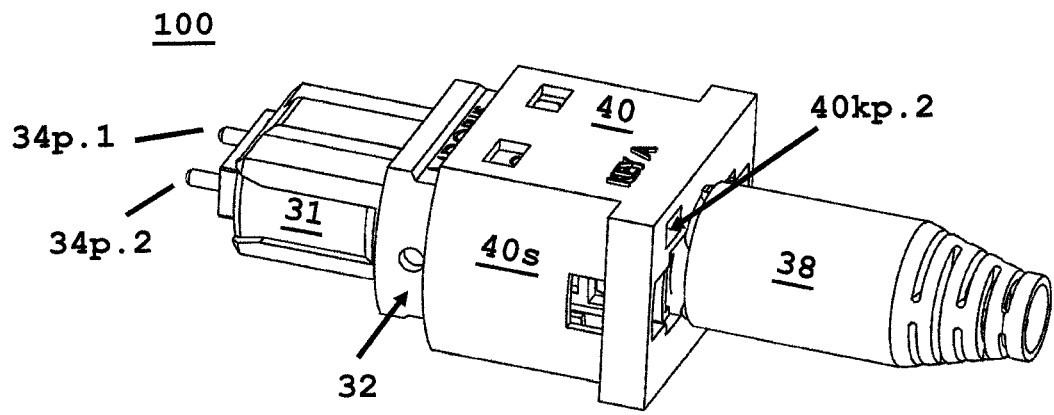
FIG. 9 depicts an assembled perspective view of the MPO connector of FIG. 5 assembled with the rear body of FIG. 7.

FIG. 8 depicts assembled MPO connector (80) with rear body (40) at distal end of slidable outer housing (32), the cut-away shows slot (40*s*.1) on a first side of the outer housing (32), the second opposing slot (40*s*.2) is not shown. Rear body (40) shield (40*s*) protects slots (40*s*.1, 40*s*.2) to avoid moving slidable outer housing (32) in a rearward direction to release adapter latch arms (10*l*.1, 10*l*.2) that releases the MPO connector (80) from MPO adapter port. FIG. 9 depicts MPO connector (80) assembly (100) with rear body (40) shield (40*s*) about slidable outer housing (32) biased forward about inner housing (31), under influence of bias member (32*a*). Pin keeper pins (34*p*.1, 34*p*.2) is the proximal end of the MPO connector assembly.

Figure 10B:
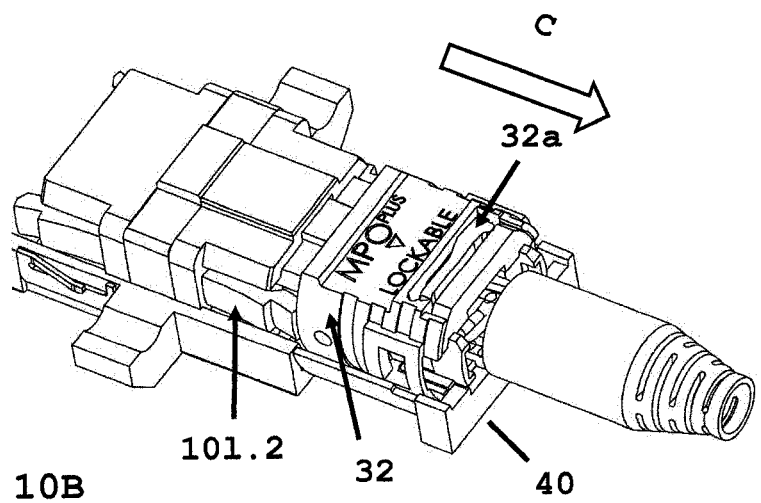
FIG. 10B depicts a cross-section top view of the MPO connector of FIG. 9 partially inserted into the prior art MPO adapter.
Figure 10C:
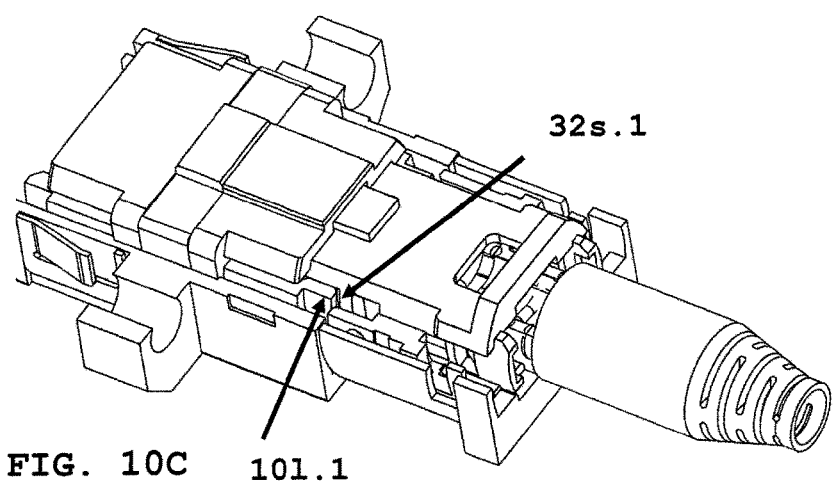
FIG. 10C depicts a cross-section top view of the MPO connector of FIG. 9, the MPO adapter latch hooks reached the slots.
Figure 10D:
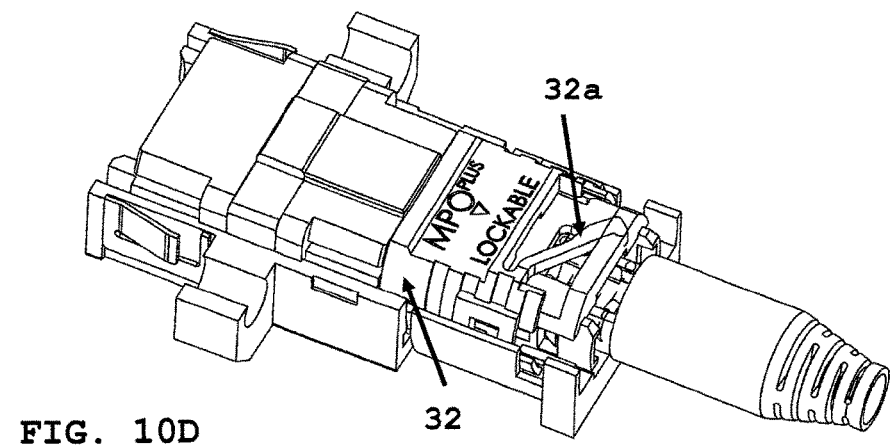
FIG. 10D depicts a cross-top view of the MPO connector of FIG. 9 fully inserted into the prior art MPO adapter.
Figure 10E:
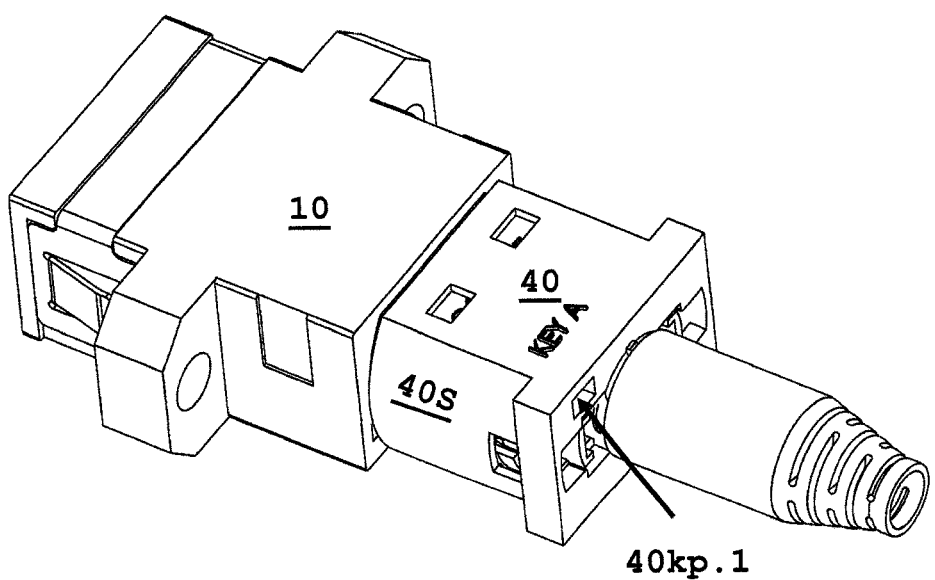
FIG. 10E depicts the assembly view of the MPO connector of FIG. 9 secured with the prior art MPO adapter.

FIG. 10A to FIG. 10E illustrates the operation of securing the MPO connector (80) with rear body (40) called MPO connector assembly (100) (refer to FIG. 9) just prior to insertion, (I), into MPO adapter port defined by latch arms (10*l*.1, 10*l*.2). FIG. 10B depicts partial insertion of connector assembly (100). As the connector is inserted, bias member is compressed (C) due to adapter latch hooks bend outward and push distally or in rearward direction slidable outer housing (32), until the bias member (32*a*) is fully compressed. FIG. 10C depicts opposing adapter latch arms (10*l*.1 10*l*.2) reaching opposing outer housing slots (32*s*.1, 32*s*.2) (refer to FIG. 5) and the outer slidable housing (32) is no longer being compressed, so the bias member (32*a*) returns outer housing (32) forward or proximal to its original position covering the inner housing (31) and the opposing adapter latch arms (10*l*.1, 10*l*.2) and MPO connector (80) is mated with MPO adapter port, as shown in FIG. 10D were bias member (32) is relaxed and outer housing (32) is fully forward about inner housing (31). FIG. 10E depicts MPO connector assembly (100) fully inserted into MPO adapter port (110), with shield (40*s*) covering any access to slots (40*s*.1, 40*s*.2) to removed MPO connector (80) from the adapter port with key (50).

Figures 11, 12:
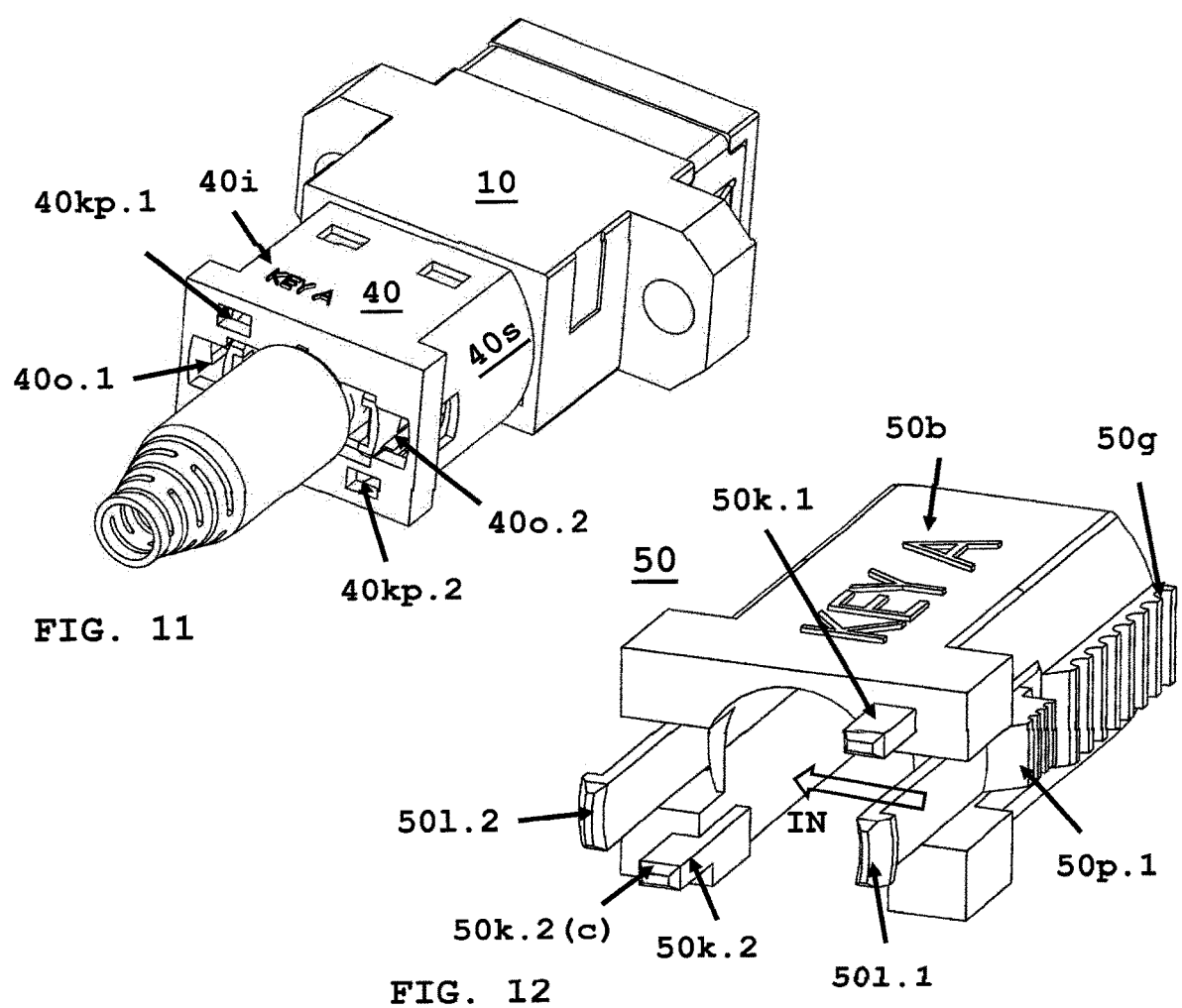
FIG. 11 depicts a rear, perspective view of the assembly of FIG. 10E.
FIG. 12 depicts a perspective view of a key or removal tool according to a first embodiment of the key.

FIG. 11 depicts a distal or rear view of connector/adapter assembly (110). FIG. 11 depicts two key passage (40*kp*.1, 40*kp*.2) formed as part of rear body (40) diagonally across from each other, but may be side by side or one above another without departing from the scope of the present invention. On an outside surface of rear body is key indicator (40*i*). Rear body (40) further comprises key latch arm ports or openings (40*o*.1, 40*o*.2). FIG. 12 depicts a first embodiment of key (50) or removal tool with key body (50*b*). Key (50) has user grip portion (50*g*), and flexible arms (50*l*.1, 50*l*.2) that are inserted through rear body openings (40*o*.1, 40*o*.2) to displace adapter latch arms to release the MPO connector from the adapter. Flexible latch arms can be pushed inward, along arrow (IN), approximately near pressure point (50*p*.1, 50*p*.2) to remove key (50) from MPO connector assembly (100) as shown in FIG. 14E. Key (50) further comprise keys (50*k*.1, 50*k*.2) sometimes called pattern keys of a particular shape configured to be received with key passage (40*kp*.1, 40*kp*.2), which allows latch arms (50*l*.1, 50*l*.2) to displace adapter latch arms to release the MPO connector from the adapter port. Key (50) pattern keys are chamfered (50*k*.2(*c*)) to reduce jamming and to allow for insertion within binding. The keys differ in size and shape to increase the number of locking combinations, as discussed in FIG. 16 to FIG. 19.

Figure 13A:
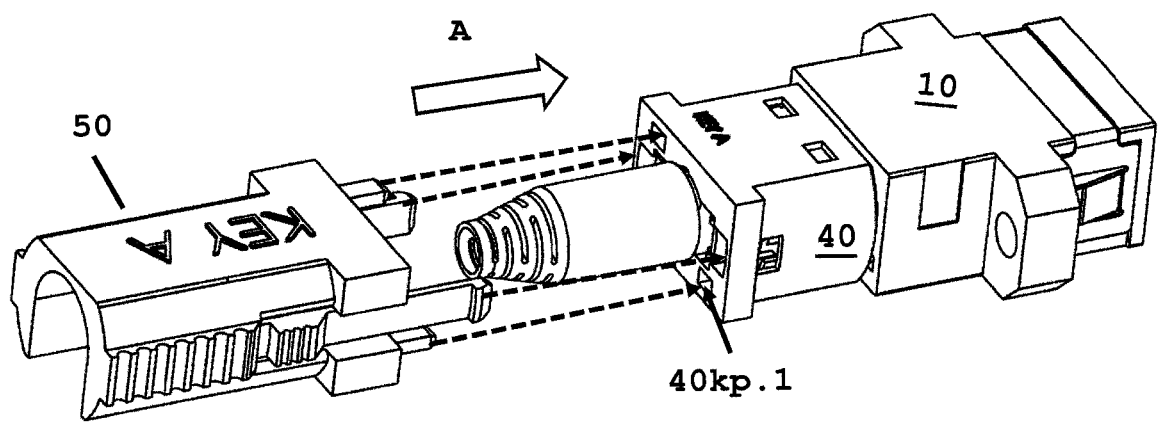
FIG. 13A depicts inserting the key of FIG. 12 within the rear body of the MPO assembly of FIG. 11.
Figure 13B:
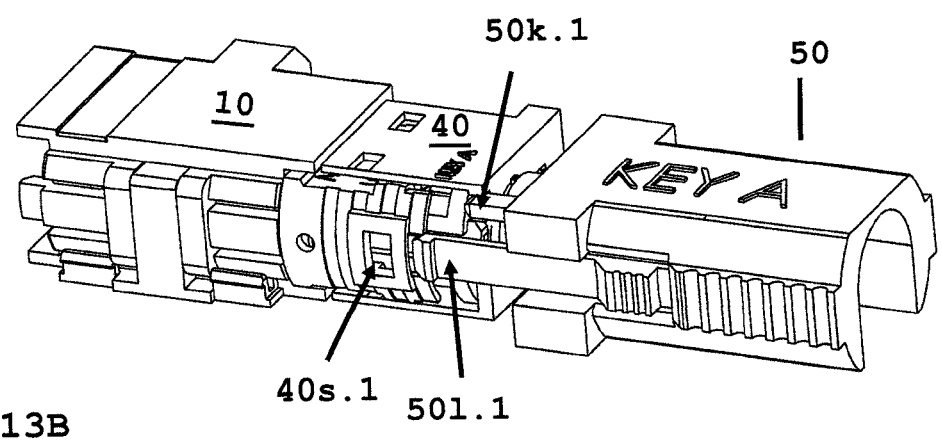
FIG. 13B depicts a cut-away, side view of the partial insertion of the key of FIG. 12 within the rear body of the MPO assembly of FIG. 11.
Figure 13C:
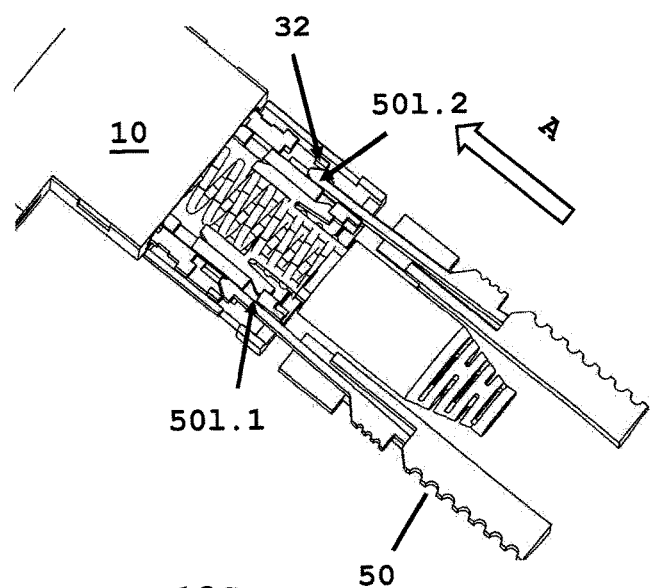
FIG. 13C depicts a top, cut-away view of MPO assembly being inserted via the rear body to unlock the MPO connector, of FIG. 9 from the prior art MPO adapter.
Figure 13D:
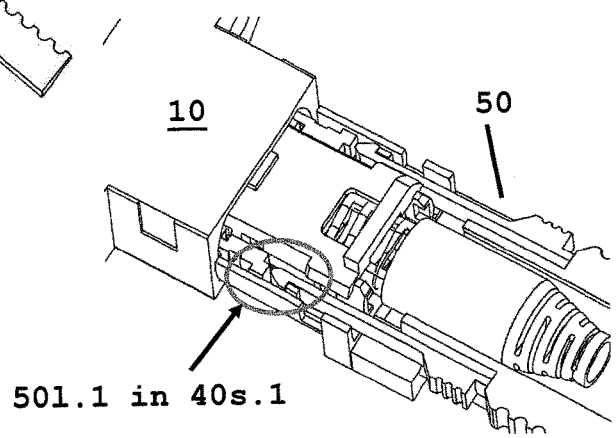
FIG. 13D depicts a top, cut-away view of the tool latches mating the slots.
Figure 16:
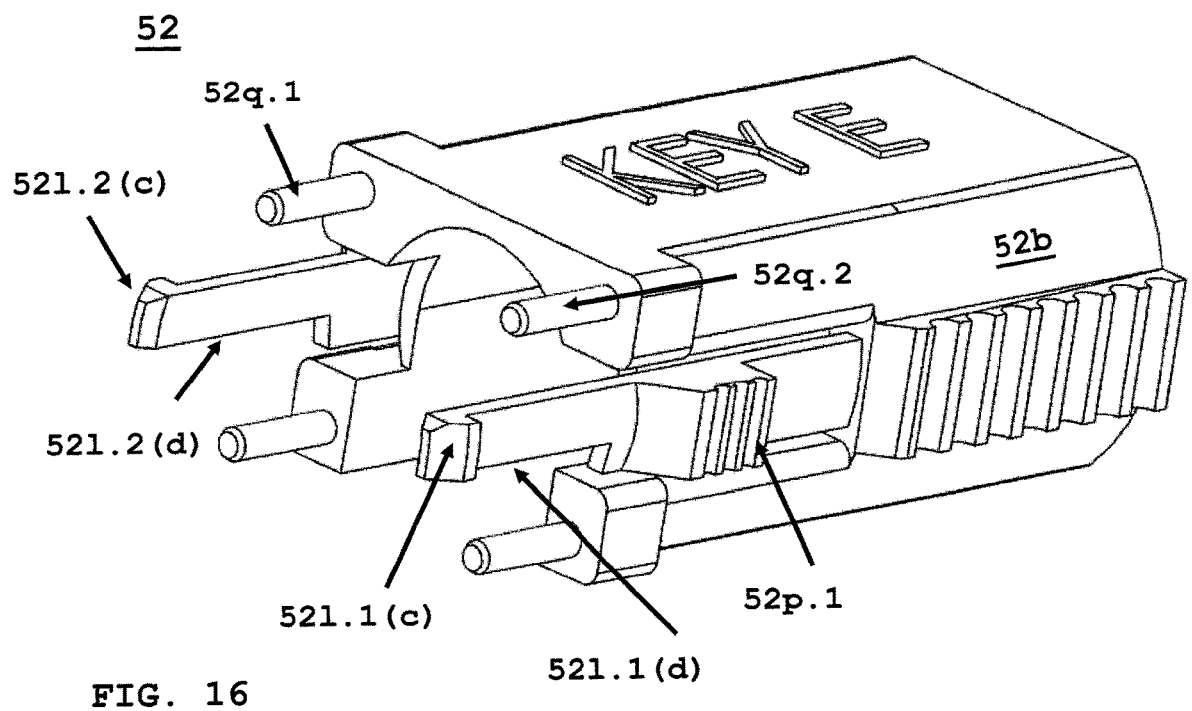
FIG. 16 depicts a perspective view a second embodiment of a key.

FIG. 13A to FIG. 13C depicts using a removal tool (50) along arrow (A) into a distal end of rear body (40) secured about MPO connector (80), with latch arms (50*l*) and keys (50*k*) properly received within rear body (40) to unlock connector from adapter. FIG. 13B depicts latch arm (50*l*.1) proximal to slot (40*s*.1) and key (50*k*.1) received within key passage (40*kp*.1). FIG. 13C depicts key (50) or removal tool being moved in direction of arrow (A), the key chamfers (50*k*.1(*c*)) guide the key (50*k*.1) within key passage (40*kp*.1), and chamfers (52*l*.1(*c*), 52*l*.2(*c*)) engages the outer housing walls compressing the latch arms (52*l*.1, 52*l*.1) (refer to FIG. 16) inward. The latch arms of key (50, 52, 54, 56 and 58) (FIGS. 12, 16, 17, 18, 19) all have chamfers as shown in FIG. 16, the chamfers of each key performing the same function discussed above with the outer housing walls. FIG. 13D depicts the tool (50) fully inserted and latch arm (50*l*1.1) expands through slot (40*s*.1).

Figure 14A:
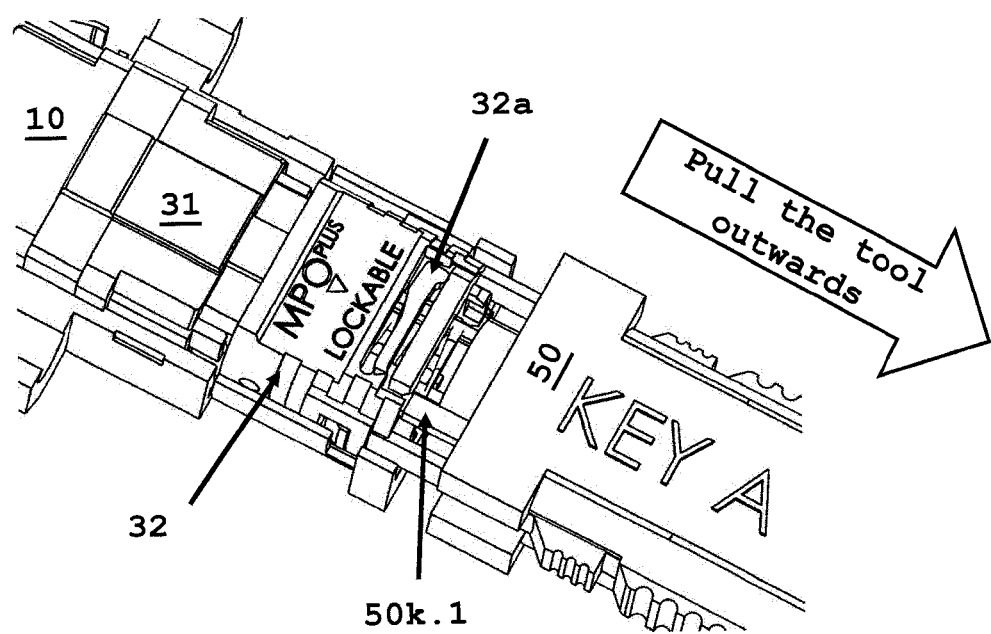
FIG. 14A depicts the tool fully inserted via the rear body of the MPO connector of FIG. 9, and starting the unlocking or removing of the MPO connector from the port of the standard MPO adapter.
Figure 14B:
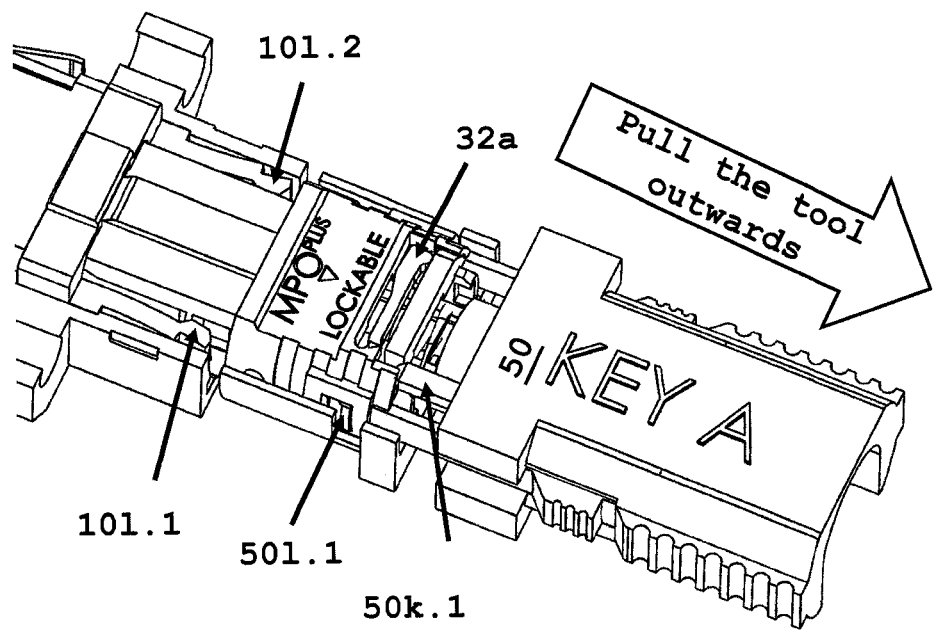
FIG. 14B depicts pulling the tool rearward to unlock the MPO connector from the MPO adapter.
Figure 14C:
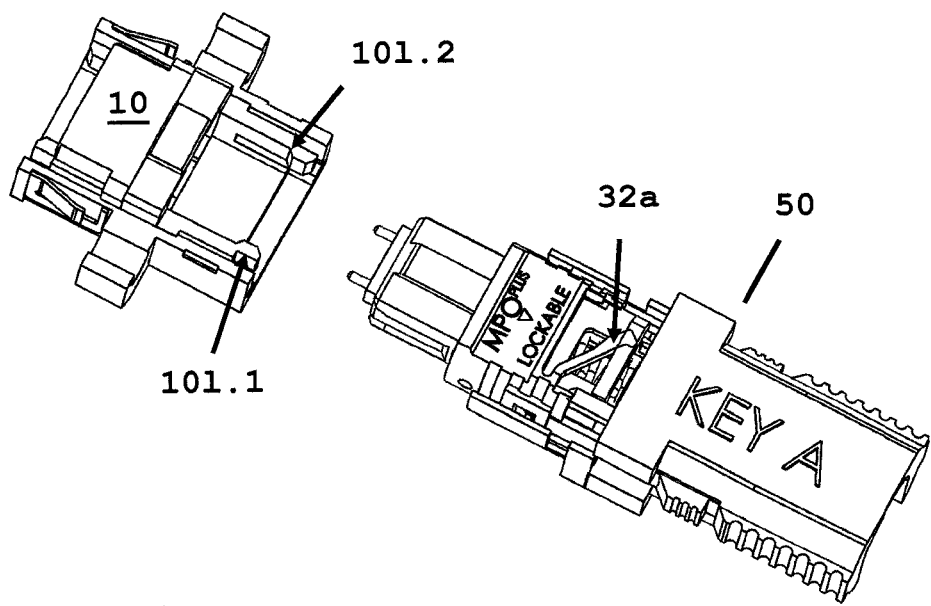
FIG. 14C depicts the MPO connector of FIG. 9 removed from the MPO adapter.
Figure 14D:
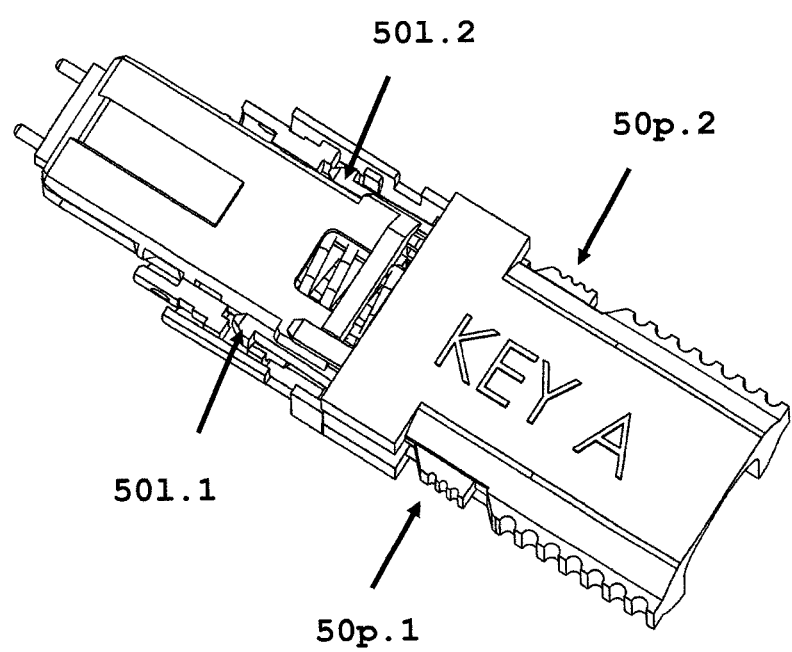
FIG. 14D depicts a cut-away view of MPO connector and key.
Figure 14E:
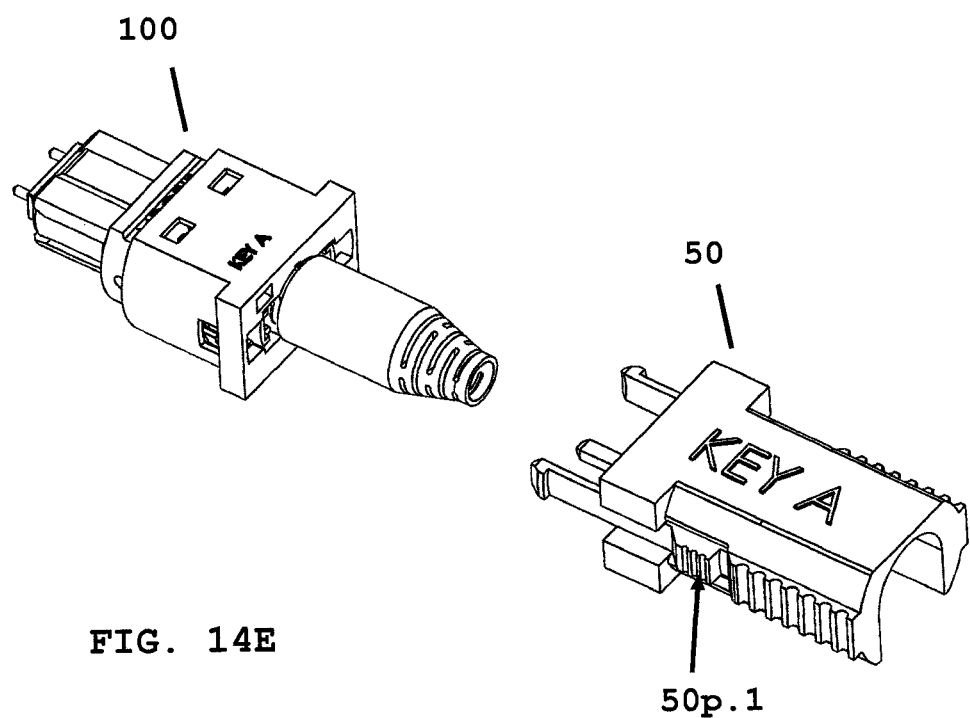
FIG. 14E depicts the key and MPO connector separated.

FIG. 14A through FIG. 14E depicts removing MPO connector assembly (100) from MPO connector/adapter assembly (110). FIG. 14A illustrates pulling key or tool (50) rearward in direction of arrow. Bias member (32*a*) is compressed as slidable outer housing (32) is displaced rearward exposing the adapter latch arms (10*l*.1, 10*l*.2). FIG. 14B depicts exposed adapter latch arms (10*l*.1, 10*l*.2) as key latch arms (50*l*.1) are secured within slot (40*s*.1) as key (50) is pulled outwards. The key latch arm acts as an actuator arm for releasing the MPO adapter latches from the inner housing of the MPO connector, the actuator arm also attaches to a slot (40*s*.1, 40*s*.2) formed as part of the slideable outer housing (refer to FIG. 8) to permit the MPO connector assembly (100) to be removed from the MPO adapter port (refer to FIG. 14C). FIG. 14C depicts MPO connector (80) with key (50) removed from adapter (10) port defined by opposing latch arms (10*l*.1, 10*l*.2). Bias member (32*a*) returns to its original position. FIG. 14D depicts key (50) secured to MPO connector (80). Latch arms (50*l*.1, 50*l*.2) are within slots (40*s*.1, 40*s*.2) respectively. To remove key (50), user will depress key latch arms (50*p*.1, 50*p*.2) that moves the proximal end of the latch arms out of their corresponding slot. FIG. 14E depicts MPO connector assembly (100) separated from key (50). The other keys (52, 54, 56 and 58) are removed from the MPO connector assembly (100) by the same operation of pressing points (50*p*.1, 50*p*.2) to move the latch arms inward as depicted in FIG. 12.

Figure 15:
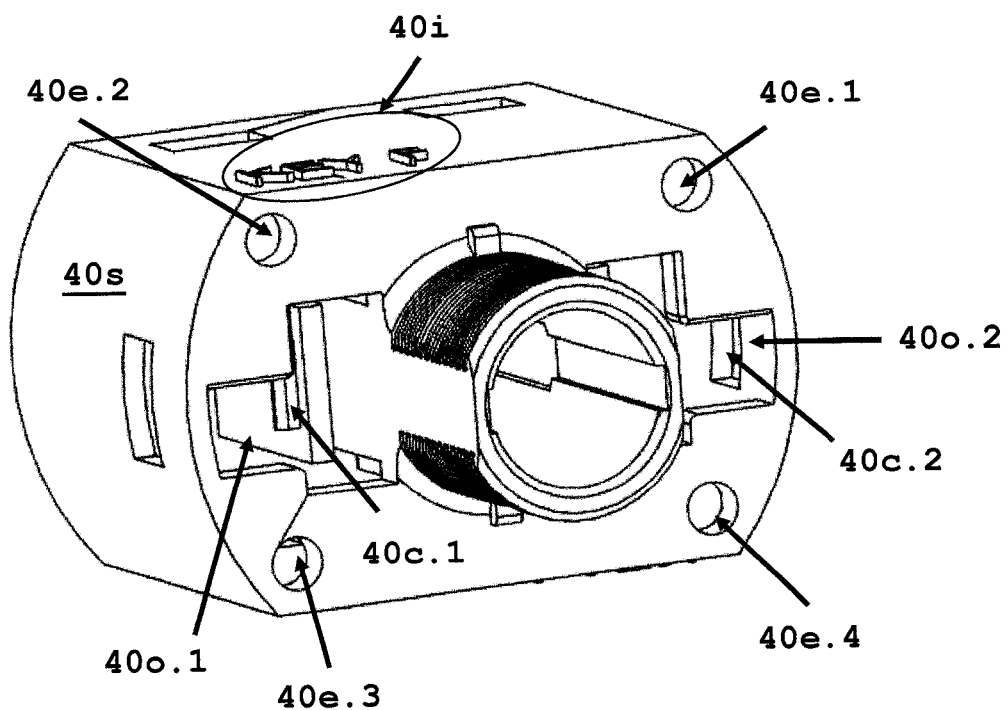
FIG. 15 depicts a rear view of a second embodiment of the rear body.

FIG. 15 depicts a second embodiment of rear body (40) with shield (40*s*). Rear body (40) has symmetric align pin openings (40*e*.1-40*e*.2) configured to received corresponding alignment pins (52*q*.1-52*q*.4) formed as part of key (52) (refer to FIG. 16), and likewise for keys (54, 56 and 58). Opposing openings (40*o*1, 40*o*.2) have internal cut-outs (40*c*.1, 40*c*.2) that correspond to cutouts formed as part of opposing key latch arms (52*l*.1(*d*), 52*l*.2(*d*)) (refer to FIG. 16).

Figure 17:
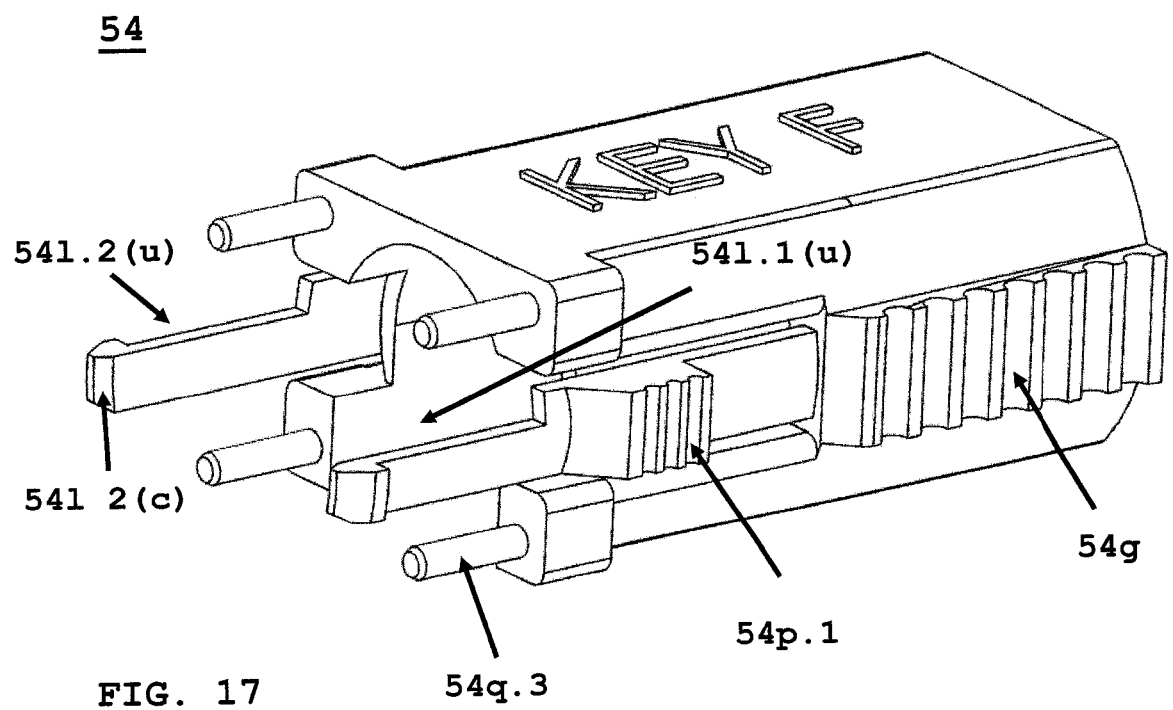
FIG. 17 depicts a perspective view of a third embodiment of a key.
Figure 18:
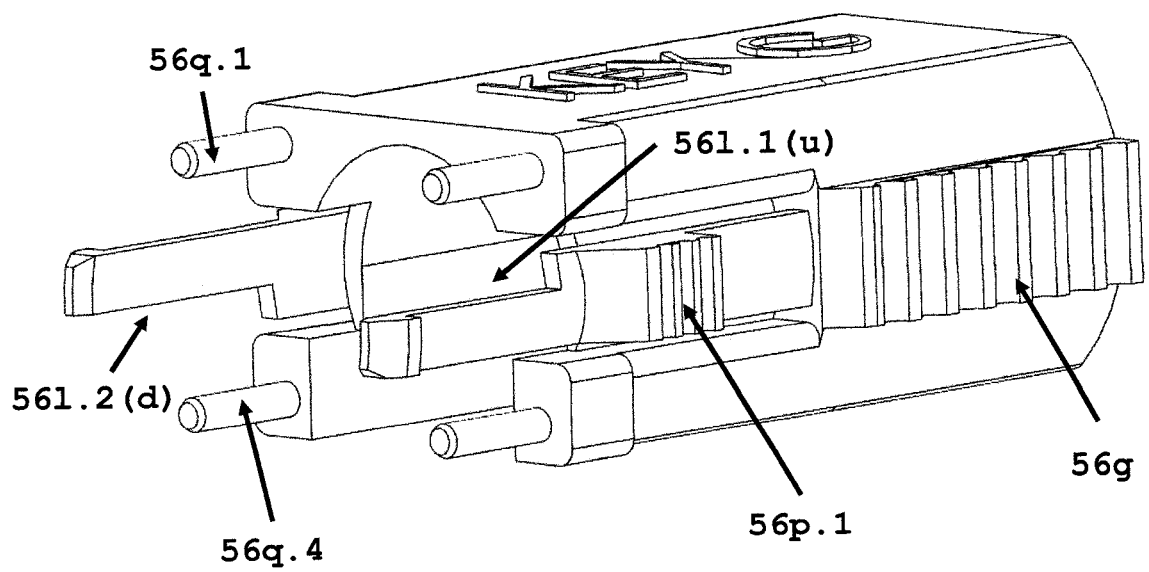
FIG. 18 depicts a perspective view of a fourth embodiment of a key.
Figure 19:
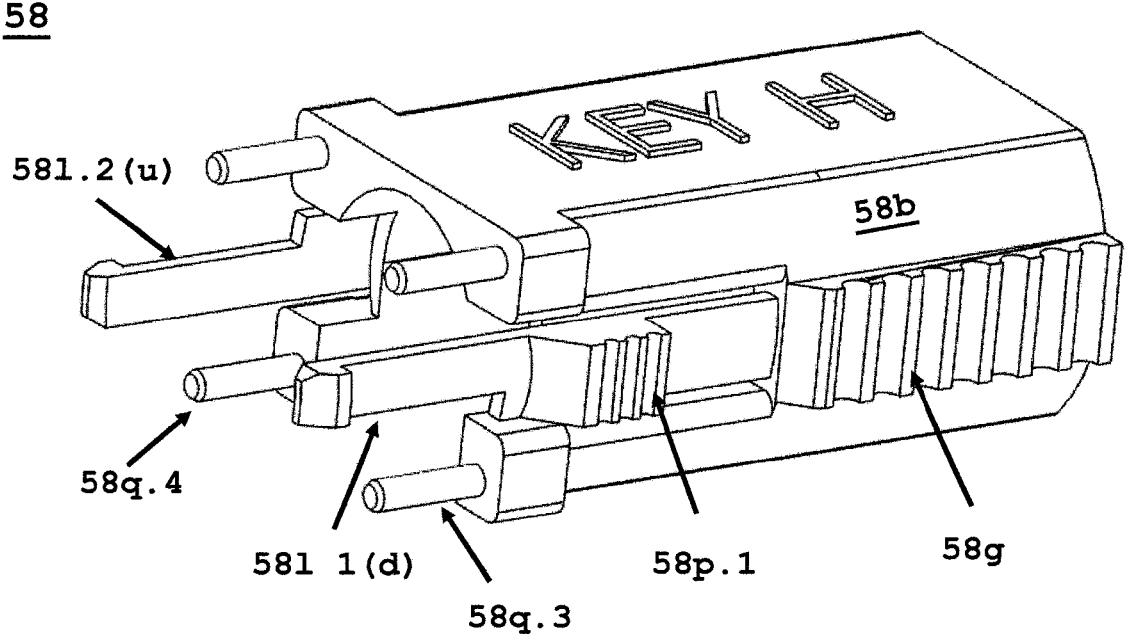
FIG. 19 depicts a perspective view of a fifth embodiment of a key.

FIG. 16 depicts key E (52) with opposing latch arms (52*l*.1(*d*), 52*l*.2(*d*)) with cutouts down (*d*). The latch arm cutouts for Key E combination lock. Each latch arm has a chamfer (52*l*.1(*c*)) at a proximal end as discussed above. FIG. 17 depicts key F (54) with opposing latch arms with cutouts facing up (54*l*.1(*u*), 54*l*.2(*u*)). The latch arm cutouts form Key F combination lock. FIG. 18 depicts key G (56) with opposing latch arms with a first latch arm cutout up (56*l*.1(*u*)) and second latch arm cutout down (56*l*.2(*d*)). The latch arm cutouts form Key G combination lock. FIG. 19 depicts key H (58) with opposing latch arms with a first latch arm cutout up (58*l*.1(*d*)) and second latch arm cutout down (58*l*.2(*u*)). The latch arm cutouts form Key H combination lock.

Although a fiber optic connector has been used as an illustrative embodiment, this detailed description is not so limited, as any type of electrical and/or communication connector may be used according to some embodiments. The connectors, adapters, and lockable components thereof may be used in combination with other connection elements and/or materials, such as crimpers, bands, straps, ferrules, locking materials, fluids, gels, or the like.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A lockable MPO connector, comprising:
an inner housing having an inner cavity, an open front and being configured to receive a latch for connecting the MPO connector to an adapter, the inner cavity being sized and shaped for receiving an MPO ferrule so that the MPO ferrule is accessible for optical connection through the open front,
a slidable outer housing at least partially received around the inner housing, the slidable outer housing configured for sliding relative to the inner housing for disconnecting the lockable MPO connector from the adapter;
a rear body including a shield, the shield defining a space receiving at least a portion of the slidable outer housing therein, the shield being configured so that when the lockable MPO connector is connected to the adapter, the shield and the adapter cooperate to block finger access to the outer housing, the shield defining an opening through which a portion of a removal tool is insertable into the space;
wherein the slidable outer housing is configured to operatively engage the portion of the removal tool inserted into the space such that the slidable outer housing can be activated by the removal tool to slide within the space for disconnecting the lockable MPO connector from the adapter.

2. The lockable MPO connector according to claim 1 wherein the rear body further comprises a key passage extending through the rear body and to the outer housing.

3. The lockable MPO connector according to claim 2 wherein the key passage has an internal shape selected to receive a key of the removal tool having a particular shape.

4. The lockable MPO connector according to claim 3 wherein the key passage is partially defined by the outer housing.

5. The lockable MPO connector according to claim 3 wherein there are two key passages.

6. The lockable MPO connector according to claim 3 in combination with the removal tool, the key including at least one elongate key arm sized and shaped for reception in the key passage for use in aligning the removal tool with the rear body for disconnecting the lockable MPO connector from the adapter.

7. The lockable MPO connector according to claim 6 wherein the portion of the removal tool comprises latch arms and the outer housing includes slots for attachment to the latch arms whereby the outer housing can be slid to permit release of the adapter latches from the inner housing.

8. The lockable MPO connector according to claim 1 wherein the shield has a cup shape.

9. The lockable MPO connector according to claim 1, wherein the outer housing further comprises a bias member in the form of a leaf spring constructed and arranged to engage the inner housing to bias the outer housing to slide toward the open front of the inner housing to a position for blocking release of the adapter latches from the inner housing.

10. The lockable MPO connector according to claim 9 wherein the leaf spring is formed as one piece with the outer housing.

* * * * *